Aug. 29, 1944.  W. A. SCHULZE  2,356,890
PROCESS FOR THE DEHYDRATION OF FLUIDS
Filed Feb. 2, 1942
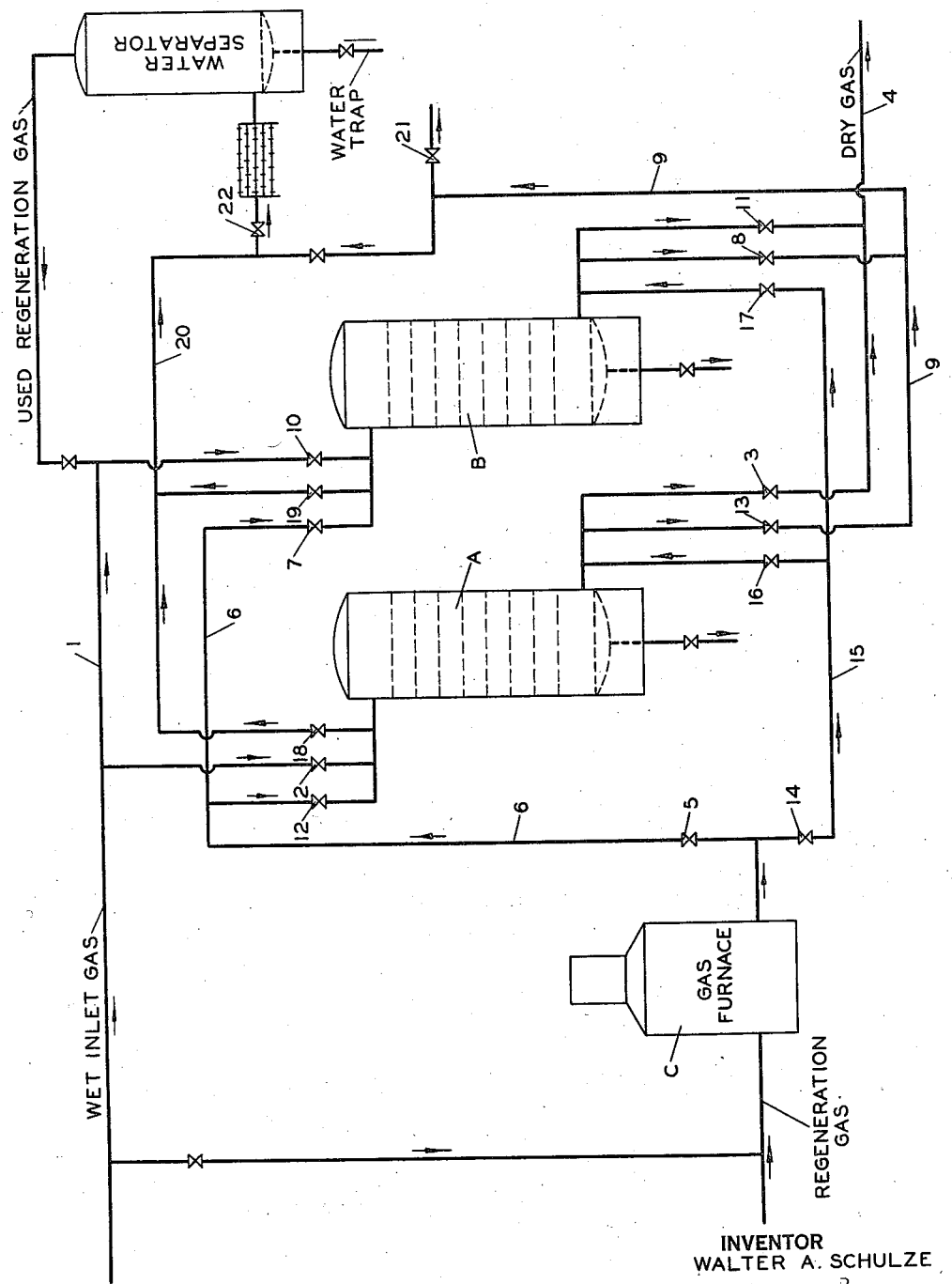
INVENTOR
WALTER A. SCHULZE
BY
Hudson, Young & Yinger
ATTORNEY Patented Aug. 29, 1944

2,356,890

UNITED STATES PATENT OFFICE 2,356,890

PROCESS FOR THE DEHYDRATION OF FLUIDS

Walter A. Schulze, Bartlesville, Okla., assignor to Phillips Petroleum Company, a corporation of Delaware Application February 2, 1942, Serial No. 429,331

9 Claims. (Cl. 196—4)

This invention relates to an improved process for the dehydration of fluids. More specifically, this invention provides an improved method for the removal of water from gases and liquids including hydrocarbons and the like by passing the substances to be dried through a bed of solid desiccating material possessing novel properties.

It is frequently desirable and many times necessary to remove either the greater portion of water or the last traces of moisture from gases or liquids. For example, the freezing troubles of the natural gas pressure systems caused by the formation of hydrates may be eliminated by removing a sufficient amount of the water vapor so that the dew point of the gas is at least as low as the minimum temperature of the gas at the maximum pressure. Also, it may be necessary to remove the last traces of moisture from certain organic substances as gasolines, alcohols, esters, etc., to forestall detrimental catalytic effects or other adverse effects such as corrosion, and the like.

It is known that adsorbent materials such as bauxite, activated alumina, silica gel, and the like have desiccating properties, and that such materials may be reactivated and reused by heating to drive out adsorbed water. Various processes have been described wherein fluids to be dehydrated were passed through beds of these granular adsorbent desiccants to obtain a degree of water removal depending on the adsorptive capacity of the desiccant and the maximum adsorbed water content reached prior to renewing or reactivating the desiccant. Such materials are often superior to solutions of inorganic salts or organic compounds, particularly for treating fluids which are miscible and/or reactive with aqueous solutions or which must be substantially completely dehydrated.

The above mentioned adsorbents, however, have a limited capacity for water, and require somewhat frequent reactivation, which involves heating the entire bed and sweeping out the adsorbed water removable at the reactivation temperature. Thus, in order to increase the capacity of a bed of a desiccant and lengthen its dehydration service, hygroscopic salts may be added and distributed over the adsorbent granules in such a manner that the adsorptive capacity of the desiccant is utilized to retain the solution and/or hydrate of the hygroscopic salt instead of water alone.

The limitation on the increased water capacity secured through the use of a hygroscopic salt in this manner is determined by the capacity of the adsorbent base material to retain the aqueous salt solution which results from the addition of water. If the concentration of the hygroscopic salt is great enough and the water content of the incoming fluid high enough, the accumulated aqueous solution may build up on the carrier in the initial increments of the bed to the point where an aqueous phase separates from the base material. Mechanical difficulties are thus encountered by the formation of this unadsorbed aqueous solution which eventually destroy the desiccant. These may include packing, channeling and disintegration of the granular base material and washing away of the impregnated salt. Furthermore, these effects accompanying the formation of a separable aqueous solution in the portion of the bed first contacted by the water-containing fluid may occur while the rest of the bed of desiccant is still operating at satisfactory drying efficiency, so that the calculated overall capacity of the bed is decreased and reactivation must be practiced at more frequent intervals.

One object of this invention is to provide a desiccant material having an increased absorptive capacity for water without forming an aqueous layer during dehydration. A further object is to provide a desiccant having an improved drying efficiency.

A still further object is to provide an improved desiccant for a continuous process for the removal of water from gases and liquids. Another object is to provide a process for water removal from fluids in a bed of adsorbent material designed for maximum adsorption throughout its length.

This invention overcomes the above-mentioned difficulties and provides an improved desiccant prepared by impregnating a granular adsorbent material with a hygroscopic salt in such a manner that the concentration of the hygroscopic salt on the adsorbent material increases in the direction of the flow of the fluid being dehydrated. The concentration of the hygroscopic salt in each increment of the bed is so regulated that when the maximum amount of water is adsorbed thereon (that is, when the water vapor pressure of the increment of the desiccant bed equals that of the passing fluid), the weight of aqueous solution formed by the salt does not exceed the adsorptive capacity of the carrier. The concentration of the hygroscopic salt is gradually increased in successive increments along the length of the bed in such a manner as to correspond inversely with the decreased water vapor pressure of the progressively drier fluid passing through the bed.

An advantage of this method of impregnation is an increased dryness of the treated fluid obtained by true counter-current dehydration. Thus, as the water vapor pressure of the fluid decreases with the distance travelled through the bed, the fluid comes in contact with a stronger drying agent. A further advantage is that the adsorptive capacity and the dehydration period of the bed as a whole is increased by the prevention of the formation of a separate aqueous phase before the maximum capacity of the bed is utilized. A still further advantage is that this increase in adsorptive capacity and efficiency is attained with no actual increase in the total amount of impregnated salt so that improved results may be obtained at no greater cost.

So that this invention may be better understood reference will be made to the accompanying drawing which diagrammatically illustrates an apparatus that may be used in continuously applying the desiccant of the invention to the dehydration of gases.

Referring to the drawing, A and B are the vessels which contain the desiccating material prepared in accordance with the invention. One vessel operates on the drying cycle while the other is regenerating. For example, the wet inlet gas passes through pipe 1 and valve 2 into the desiccating chamber A. The dried gas is then removed through valve 3 and pipe 4. Simultaneously, regeneration is carried on in vessel B as follows: the regeneration gas is heated to the required temperature in the gas furnace C, allowed to pass through valve 5, pipe 6, and valve 7 into chamber B. The heated gas in passing through the desiccant bed carries off the moisture in the form of water vapor. This wet regeneration gas is removed through valve 8 and pipe 9. The regeneration gas may be residue or waste gas of suitable composition in which case the spent gas is removed through valve 21 and vented or used as fuel. Or, a portion of the wet inlet gas may be diverted from the main stream and used as regeneration gas. In this case, the wet gas is passed through valve 22 into the water condenser and water separator where the greater part of the moisture in the gas is removed. The used regeneration gas is then mixed with the main stream to the bed. When the desiccant in vessel A is spent, the wet inlet gas is run into the regenerated desiccant in vessel B through pipe 1 and valve 10 while tank A is cut off at valve 2. Removal of the dried gas from B is accomplished through valve 11 and pipe 4. The wet desiccant in tank A is regenerated by passing the hot gas from the furnace through valve 5, pipe 6, and valve 12 into tank A, and then removing the wet gas by way of valve 13 and pipe 9. Piping is also provided so that regeneration can be brought about by passage of the gas upwards through the desiccating bed. This is accomplished by passing the regeneration gas through valve 14 and pipe 15 and then into either tank A or B through valves 16 or 17. The outlet for the regeneration gases is through valve 18 or 19 and pipe 20. While this arrangement shows a separate furnace for the regeneration gas, other means of supplying the necessary heat may be provided.

The dehydrating agent in vessels A and B consists of a bed of granular adsorbent desiccant such as bauxite arranged in a series of separated or contiguous increments bearing a hygroscopic salt. The concentration of the hygroscopic salt with which each increment of the bed is impregnated is varied so that the smallest concentration is present in the increment adjacent to the entry port and the largest concentration is adjacent to the exit port of the vessel. The intermediate increments bear intermediate concentrations of salt increasing in the direction of fluid flow through the bed in the dehydrating cycle.

The pressure of the inlet gas may range from atmospheric to 1000 pounds per square inch depending on the composition of the gas to be dried, being kept lower than the pressure necessary to liquefy the gas. In the case of liquids or liquefied gases, the liquid is simply pumped into the top of the desiccating chamber and removed from the bottom at the same rate. To provide the greatest absorptive capacity, the temperature of the inlet fluid and the drying bed should be kept as low as possible, preferably within the range of 32° to 100° F. Higher temperatures may be used, but the efficiency and extent of dehydration is impaired thereby due to the increased vapor pressure of water in the desiccant with increasing temperature. The temperature of the regeneration gas may range from 300° to over 600° F., depending on the desiccant employed. The preferred range is 400° to 600° F. when using materials such as bauxite and silica gel, although lower temperatures may be used with certain synthetic alumina.

The adsorbent materials that can be used in this invention are preferably such natural substances as bauxite, fuller's earth, acid clay, although excellent results are obtained at somewhat higher cost with such synthetic adsorbents as activated alumina and silica gel. These adsorbent materials may be activated before use by calcining at temperatures of 500° to 1500° F. The granular adsorbent materials are used in suitable particle size for permitting fluid flow without excessive pressure drop even in relatively deep beds and at flow rates consistent with efficient dehydration.

The hygroscopic salts referred to are of that class which are substantially inert toward the fluids treated and which have an affinity for water at the temperature range of the drying bed. These salts can substantially be dehydrated at the temperatures used for reactivation of the desiccant composition. Of these salts, the preferred one for this invention is lithium chloride as will be made evident from the examples to be described. Other salts which are useful are calcium chloride, magnesium sulfate and chloride and others having strong hydrate-forming tendencies.

The preparation of the desiccant may be accomplished by spraying the adsorbent carrier with a solution of the hygroscopic salt to give the desired weight of salt on the adsorbent. For example, in the preparation of 100 pounds of bauxite impregnated with one per cent of lithium chloride, a saturated solution containing one pound of lithium chloride is prepared and sprayed evenly on the calcined bauxite. The desiccant material is then dried at the preferred regeneration temperature and an activated product is thus produced. In this manner adsorbent material containing varying amounts of impregnated salt can be prepared. The desiccating chamber is then prepared for use by putting in the bottom of the chamber a layer or section of adsorbent containing the greatest amount of impregnated salt. Sections of desiccant are then put over this bottom layer, each added section containing a smaller amount of impregnated salt than the one below it. The number of sections and the range of concentration is determined by the wetness of the fluid to be treated and by the extent to which the effluent is to be dried. Alternately, the desiccant bed may be prepared by impregnating the carrier with the maximum concentration of hygroscopic salt to be utilized, and then preparing sections or increments of lower concentration by admixing calculated quantities of untreated carrier. If desired, the sections of desiccant bearing the graduated salt concentrations may be supported separately within a single vessel or placed in separate vessels arranged for series flow.

The range of salt concentrations usually employed in preparing the impregnated desiccants will vary with the hygroscopic quality of the particular salt and the adsorbent power of the carrier. Since the preferred salts combine with large weights of water, and the preferred adsorbents retain only from about 10 to about 30 weight per cent of aqueous solutions, the corresponding quantities of the salt may range from less than 1 to about 30 per cent with the narrower range of 1 to 15 per cent ordinarily preferred. Within these limits, the desiccants may be prepared according to individual requirements with any suitable gradation of salt concentrations and any number of increments or sections.

This invention is applicable to the drying of such gases as air, oxygen, hydrogen, helium, butane, propane, natural gas, and by-product gas. It is also suitable for the drying of liquids such as gasoline, liquefied hydrocarbon gases, hydrocarbon liquids, and other organic liquids. This invention is suitable to the drying of gases which are saturated with water vapor in the range of temperatures and pressures specified in the operating conditions, namely 32° to 100° F. and atmospheric to 1000 pounds per square inch. The extent of drying can be carried to any desired level ranging from the water content of the incoming gas to substantially complete dryness. The preferred type of liquid to be treated with the type of desiccant described in this invention is one that is substantially immiscible with water and from which only the last traces of water are to be removed. In cases of liquids miscible with water, such as alcohols, the maximum amount of water should be first removed by such means as distillation, and the like.

To show the striking advantage of the novel desiccant composition described in this invention in allowing the maximum amount of water to be adsorbed for the production of a given dew point, the following examples will be referred to.

*Example I*

A dehydrating reagent was prepared by impregnating 600 pounds of calcined bauxite with 48 pounds of lithium chloride. The concentrations of lithium chloride were graduated by preparing six sections of the bed containing 100 pounds of bauxite and impregnated with 3, 5, 7, 9, 11 and 13 weight per cent of lithium chloride respectively in the direction of fluid flow.

A hydrocarbon gas saturated with water vapor at 65° F. and atmospheric pressure (1 pound of water per 1000 cubic feet of gas) was passed through the bed of desiccant at 65° F. and a rate of 10,000 cubic feet per hour until the bed had absorbed 10 per cent by weight of water. At this stage, the outlet gas had a dew point of —88° F. at atmospheric pressure.

When bauxite alone was employed as the desiccant under identical conditions, the bed adsorbed only about 40 pounds of water before the dew point of the treated gas rose to —40° F. at atmospheric pressure.

In a similar test 600 pounds of bauxite was uniformly impregnated with 48 pounds of lithium chloride, to produce an average concentration of about 7.5 weight per cent. When the same hydrocarbon gas was passed through this desiccant, an aqueous solution phase formed and drained from the top section of the bed after only 33 pounds of water had been adsorbed, equivalent to only about 5 weight per cent of the bed. This caused the test to be discontinued although the effluent gas had a dew point of about —65° F. at atmospheric pressure.

Similar results were obtained when using calcium chloride in the above-described tests instead of lithium chloride except that the completeness of drying was somewhat less.

*Example II*

Desiccant was prepared as in Example I with graduated concentrations of lithium chloride employed in the dehydration of liquid gasoline. Gasoline containing .003 per cent water was passed through the bed at the rate of 4,000 gallons per hour. Fifty-five pounds of water was adsorbed by the 648 pounds of desiccant before moisture was detectable in the effluent gasoline.

When desiccant was prepared with a uniform concentration of lithium chloride and the experiment was carried out with the same gasoline, only 25 pounds of water was adsorbed before moisture was detectable in the effluent gasoline. In this case, however, the moisture consisted of traces of lithium chloride solution.

*Example III*

A bed of desiccant was prepared in three sections with the following compositions in the direction of gas flow:
(1) Calcined bauxite.
(2) Bauxite impregnated with three weight per cent of lithium chloride.
(3) Bauxite impregnated with five weight per cent of lithium chloride.

The first two of the above-listed sections were of equal volume and amounted to 60 per cent of the total bed, while the third section accounted for the remainder.

The bed was employed in dehydrating a hydrocarbon gas with a dew point of 80° F. at 150 pounds gage pressure to reduce the dew point to 10° F. at the same pressure. The capacity of the bed in this service was 15 weight per cent of water when regenerated at 500° F.

The capacity of an equal volume of untreated bauxite was about nine weight per cent. When a desiccant uniformly impregnated with five weight per cent of lithium chloride was used, lithium chloride solution formed and separated in the top layer of the reagent after only eight weight per cent of water had been adsorbed.

While the above described desiccant composition is well adapted to relatively complete dehydration of gases and liquids, it may also be used as a part of a series of dehydration treatments using similar or different reagents. In some cases, in order to protect an impregnated reagent of this type from chemical and/or mechanical deterioration it may be desirable to precede it with a bed of solid granular material which removes dust, coke, entrained water or alkaline treating solutions or heavy oils or tar. This guard tower may be charged with the unimpregnated carrier material or another chosen for special properties, and the reagent may be renewed at intervals or reactivated in suitable fashion. For example, when a bauxite filter is interposed ahead of the impregnated dehydrating reagent, the bauxite may be reactivated by the described means when only water or similarly removable liquids are accumulated.

Further, the impregnated dehydrating agent of this invention may be followed, if desired, by other dehydrating treatments such as by passage through a bed of the untreated adsorbent, whereby somewhat lower water contents are obtainable than in the presence of the hygroscopic salt. In such cases, the very low water content of the effluent gas or liquid from the reagent of the present invention produces very satisfactory dehydration periods for the unimpregnated adsorbent used for the final treatment.

While the invention has been described with specific reference to the preferred operating conditions and specific materials in the exemplary operations, it will be understood that the invention is of broad scope and general application and is limited only by the appended claims.

I claim:

1. The process for the dehydration of non-aqueous fluids containing relatively minor amounts of dissolved water which comprises passing said fluids in contact with a solid desiccant consisting of granular adsorbent carrier having marked dehydrating properties and impregnated with minor proportions of a hygroscopic salt in such a manner that the concentration of said salt increases in the direction of fluid flow through the desiccant.

2. The process for the dehydration of non-aqueous fluids containing relatively minor amounts of dissolved water which comprises passing said fluids at atmospheric temperature through a contact zone containing a solid adsorbent desiccant impregnated with a minor proportion of a hygroscopic salt in such a manner that the concentration of said salt increases in successive increments of the zone in the direction of flow of the water-containing fluid.

3. The process for the dehydration of non-aqueous fluids containing relatively minor amounts of dissolved water which comprises passing said fluids in contact with a solid desiccant consisting of granular adsorbent carrier having marked dehydrating properties and impregnated with a minor proportion of a hygroscopic salt in such a manner that the concentration of said salt increases in the direction of fluid flow, whereby a major proportion of the water in said fluid is removed by the desiccant, discontinuing the flow of fluid through said desiccant, removing adsorbed water therefrom by heating to temperatures in the range of 300° to 600° F. while passing a stream of gas to sweep out desorbed water, and then returning the regenerated desiccant to dehydrating service.

4. The process as in claim 2 in which the desiccant consists of bauxite impregnated with lithium chloride.

5. The process as in claim 2 in which the desiccant consists of bauxite impregnated with lithium chloride in an amount ranging from zero to 15 per cent of the carrier.

6. A desiccant composition for the dehydration of non-aqueous fluids containing minor amounts of dissolved water which comprises a solid adsorbent desiccant bed having a marked tendency to adsorb water and impregnated with a hygroscopic salt, said salt representing a minor proportion of the desiccant composition and being added in amounts which produce an increasing salt concentration in successive increments of the desiccant composition along the length of the bed.

7. A process for dehydrating hydrocarbon fluids containing relatively minor amounts of water which comprises passing said fluid through an elongated bed of granular adsorbent impregnated with a hygroscopic salt, the concentration of said salt gradually increasing along the length of the bed to a degree corresponding inversely with the water vapor pressure of the hydrocarbon fluid passing therethrough.

8. A process for dehydrating hydrocarbon fluids containing relatively minor amounts of water which comprises passing said fluid through an elongated bed of granular adsorbent impregnated with a hygroscopic salt, the concentration of said salt gradually increasing in successive increments along the length of the bed to a degree corresponding inversely with the water vapor pressure of the hydrocarbon fluid passing therethrough.

9. A process for dehydrating hydrocarbon fluids containing relatively minor amounts of water which comprises passing said fluid through an elongated bed of granular adsorbent impregnated with a hygroscopic salt, the concentration of said salt gradually increasing along the length of the bed and so regulated that a uniform adsorption takes place throughout the bed.

WALTER A. SCHULZE.